No. 685,014. Patented Oct. 22, 1901.

S. H. THRESHER.

HOSE COUPLING.

(Application filed Apr. 2, 1901.)

(No Model.)

Witnesses
Frank G. Campbell.
F. N. Haviland

Inventor
Seneca H. Thresher.
By his Attorney. F. H. Richards.

UNITED STATES PATENT OFFICE.

SENECA H. THRESHER, OF NORWICH, CONNECTICUT, ASSIGNOR OF TWO-THIRDS TO JOHN H. BARNES AND JAMES O'CONNELL, OF NORWICH, CONNECTICUT.

HOSE-COUPLING.

SPECIFICATION forming part of Letters Patent No. 685,014, dated October 22, 1901.

Application filed April 2, 1901. Serial No. 54,024. (No model.)

*To all whom it may concern:*

Be it known that I, SENECA H. THRESHER, a citizen of the United States, residing in Norwich, in the county of New London and State of Connecticut, have invented certain new and useful Improvements in Hose-Couplings, of which the following is a specification.

This invention relates to coupling devices for securing sections of hose together and for attaching fittings, &c., to hose, and has for an object to provide a simple and efficient device of this character and one which may be readily applied to its intended purpose.

Figure 1:
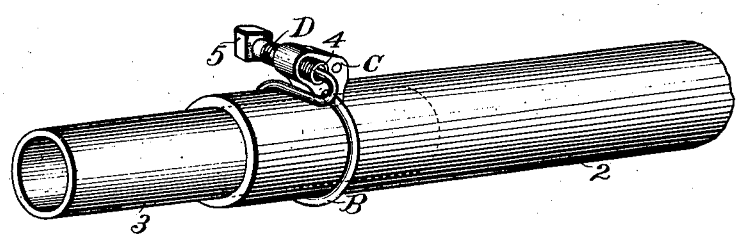
Figure 2:
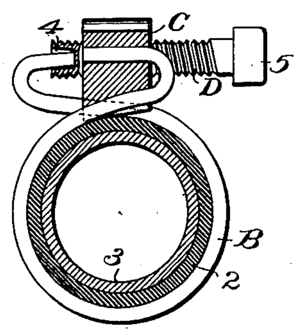
Figure 3:
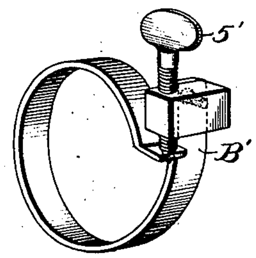

In the drawings accompanying the present specification, Figure 1 is a perspective view of the end of a section of hose, showing a device embodying the present invention used for the connection of a fitting thereto. Fig. 2 is a cross-sectional view of the parts connected and the device shown in Fig. 1, this figure being upon a somewhat larger scale than that to which Fig. 1 is drawn. Fig. 3 is a perspective view of a modified form of the coupling device.

Similar characters of reference designate corresponding parts in all the figures.

The device of the present invention embodies, essentially, an expansible and contractible curved band adapted to encircle the hose and by its contraction to clamp the same to the fittings, &c., which it is desired to connect to the end of the hose. This encircling band is of any appropriate form and material—thus, for instance, it may be a simple wire bent to a substantially circular form, as shown in Figs. 1 and 2, in which figures the band is designated by B, or the encircling band may be a flattened strip B', as shown in Fig. 3. An application of the device is represented in a general way in Fig. 1, the end 2 of a hose length being indicated and in which is inserted a fitting 3, represented as a pipe length, which, for instance, may be utilized for connecting the hose length to a second length. By forcing the two ends of the encircling band from each other there evidently results a contraction of the circle formed by the band, tending to compress the hose and effecting the clamping of the same to the fitting. This movement and an opposite or releasing movement of the band ends are conveniently accomplished by securing to one end of the band a reaction block or fixture C and mounting in the same suitable means for moving the other or free end of the band. This means advantageously consists of a screw, and the fixture is here shown as provided with a screw D, which enters a tapped hole in the fixture and impinges against the end of the band. In the form of the device shown in Figs. 1 and 2 the end of the band secured to the fixture is bent over upon itself and enters an opening provided for it in the fixture, such construction securely holding the two together, while the correspondingly bent free end portion of the band enters a socket or recess 4 in the end of the screw, by which means the ends may be forced apart and the circle of the band contracted. If this latter is made of elastic material, a rotation of the screw in the opposite direction permits the expansion and consequent enlargement of the circle inclosed by the band.

In the form shown in Fig. 3 and in which the band is also assumed to be of an elastic material the screw D' impinges against the outwardly-bent end of the band, being preferably seated in a recess therein. The screw in both instances is suitably constructed to facilitate its manipulation, the screw of Figs. 1 and 2 being shown as having a squared end 5, while in Fig. 3 it is provided with a thumb-piece 5'.

Having described my invention, I claim—

1. A hose-coupling comprising a clamping-band bent to form substantially an overlapping circle of one convolution, with the opposite ends lying side by side, in combination with a fixture separate from and rigidly secured to one end of the band; and a screw engaging with a tapped hole in the fixture and impinging against the opposite end of the band for forcing the two ends apart and thereby cause a contraction of the inclosed area, one contacting surface being formed with the socket to receive the part which engages with it.

2. A hose-coupling comprising an encircling band made of an elastic material, in combination with a fixture secured to one end of the band, and a screw formed with a socket in which the free end of the band is seated and which is provided with means for facilitating its manipulation.

SENECA H. THRESHER.

Witnesses:
GEORGE E. PITCHER,
WILLIAM A. PITCHER.